United States Patent
De Vree et al.

(10) Patent No.: US 6,412,621 B1
(45) Date of Patent: Jul. 2, 2002

(54) CONVEYORS SYSTEM WITH VOLUME SHARING

(75) Inventors: Ronald J. De Vree, Hudsonville; Harry T. Edwards, Belmont, both of MI (US)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 0 days.

(21) Appl. No.: 09/422,557

(22) Filed: Oct. 21, 1999

(51) Int. Cl.⁷ .............................................. B65G 37/00
(52) U.S. Cl. ..................... 198/347.4; 198/443
(58) Field of Search ................. 198/347.1, 347.4, 198/443, 461.1

(56) References Cited

U.S. PATENT DOCUMENTS

| | | | |
|---|---|---|---|
| 2,848,096 A | 8/1958 | Luginbühl | 198/30 |
| 3,176,821 A | 4/1965 | Eldred et al. | 198/20 |
| 3,224,554 A | 12/1965 | Moulder et al. | 198/33 |
| 3,232,411 A * | 2/1966 | Kulig | 198/443 |
| 3,604,551 A | 9/1971 | Fink | 198/30 |
| 4,037,710 A | 7/1977 | Brutcher | 198/443 |
| 4,039,074 A | 8/1977 | Maxted | 198/456 |
| 4,044,897 A | 8/1977 | Maxted | 214/11 R |
| 4,111,412 A | 9/1978 | Cathers | 271/251 |
| 4,252,232 A | 2/1981 | Beck et al. | 198/443 |
| 4,284,186 A | 8/1981 | Brouwer | 198/415 |
| 4,889,224 A | 12/1989 | Denker | 198/382 |
| 5,072,822 A | 12/1991 | Smith | |
| 5,103,962 A * | 4/1992 | Voss et al. | 198/443 |
| 5,147,023 A | 9/1992 | Meindl | 198/454 |
| 5,222,586 A | 6/1993 | Ydoiate et al. | 198/452 |
| 5,240,101 A | 8/1993 | LeMay et al. | 198/443 |
| 5,301,791 A | 4/1994 | Shampine | 198/391 |
| 5,372,238 A | 12/1994 | Bonnet | 198/455 |
| 5,400,896 A | 3/1995 | Loomer | 198/415 |
| 5,418,281 A | 5/1995 | Taylor et al. | 198/448 |
| 5,701,989 A | 12/1997 | Boone et al. | 198/448 |
| 5,738,202 A | 4/1998 | Ydoate et al. | 198/460.1 |
| 5,769,204 A | 6/1998 | Okada et al. | 198/443 |
| 5,772,006 A * | 6/1998 | Axmann | 198/443 |
| 5,918,723 A | 7/1999 | Schuitema et al. | 198/347.4 |
| 5,950,800 A * | 9/1999 | Terrell et al. | 198/448 |
| 6,056,107 A * | 5/2000 | Shuitema et al. | 198/347.1 |
| 6,269,933 B1 * | 8/2001 | Shuitema et al. | 198/443 |

FOREIGN PATENT DOCUMENTS

| | | |
|---|---|---|
| DE | 2049627 | 4/1971 |
| DE | 4324536 A1 | 1/1995 |
| EP | 0414210 A1 | 2/1991 |
| GB | 2013637 A | 8/1979 |
| GB | 2256844 A | 12/1992 |
| WO | WO8101281 | 5/1981 |

OTHER PUBLICATIONS

Publicly disclosed system.

Commonly assigned co–pending application Serial No. 09/258,380 filed Feb. 26, 1999, by Ronald E. Pelka, entitled Unscrambling and Aligning Conveyor.

Commonly assigned co–pending application Serial No. 09/131,817 filed Aug. 10, 1998, by Dennis J. Schuitema, Ronald J. DeVree and Curtis E. LeMay, entitled Compact Article Unscrambler.

Commonly assigned co–pending United States patent application Serial No. 09/313,153 filed on May 17, 1999, entitled Compact Article Singulation Donveyor.

* cited by examiner

*Primary Examiner*—Douglas Hess
(74) *Attorney, Agent, or Firm*—Van Dyke, Gardner, Linn & Burkhart, LLP

(57) ABSTRACT

A conveyor system and corresponding method for article volume sharing between conveyor lines includes an overflow handler in operational connection with the alignment conveyor of each conveyor line. The overflow handler receives articles positioned outside of the alignment region of the alignment conveyor and transports the articles to an alignment conveyor positioned within an adjacent conveyor line. Volume sharing between a plurality of conveyor lines increases conveyor system throughput, particularly when one or more of the conveyor lines experiences a high volume of article flow. The conveyor system includes a deflector assembly capable of deflecting articles away from the alignment region of the alignment conveyor and towards the overflow handler, and subsequently to an adjacent conveyor line, when the sortation conveyor is jammed or offline during the performance of maintenance.

43 Claims, 8 Drawing Sheets

CONVEYORS SYSTEM WITH VOLUME SHARING

BACKGROUND OF THE INVENTION

This invention relates generally to conveyor systems, and in particular, to conveyor systems utilizing one or more conveyor lines, each of which is equipped with an alignment conveyor, or unscrambler, and a downstream process such as a sortation conveyor, or the like.

Many conveyor operations, especially those used in article distribution centers, receive a variety of articles varying in weight, height, length and depth. Normally, these articles arrive at the article distribution center via a truck or a train. The article distribution center is built having a plurality of separate unloading bays or docks, each of which provides an area for removing the articles from the truck or train and placing them onto a particular conveyor line. Many article distribution centers are constructed such that one end of the facility serves as an unloading end. Alternatively, an article distribution center may be constructed having a pair of opposing ends, each of which is formed with a plurality of unloading docks.

Each conveyor line of a conveyor system normally includes an alignment conveyor in operational connection with a sortation conveyor positioned downstream of the alignment conveyor. Once the articles are unloaded and placed upon a particular conveyor line, an input conveyor transports the articles to the alignment conveyor in random order and orientation. Upon reaching the alignment conveyor, clusters of articles are reoriented, or singulated, by the alignment conveyor to assume a single file or column. Upon singulation, the articles are forwarded to the sortation conveyor. In most applications, the sortation conveyor includes a scanner designed to read bar code information attached to an exterior surface of each article. The bar code contains information identifying the destination of the article. After scanning the articles, the sortation conveyor sorts the articles according to their destination and forwards the articles to one of a plurality of departure conveyors responsible for conveying the articles to their respective loading areas or docks. Once in the designated loading area, the articles are loaded into a train, truck or other form of transportation, and shipped to their final destination.

In article distribution centers having dual unloading ends, those articles which are not sorted by the sortation conveyor continue traveling along the conveyor line and are recirculated to the input end of the alignment conveyor on the opposing end of the article distribution center. Thus, in dual unloading end article distribution centers, each conveyor line forms an independent loop, composed of a pair of alignment conveyors located on opposing ends of the article distribution center. If only one end of the article distribution center acts as an input area for unloading articles, unsorted articles are recirculated along a recirculation conveyor to the input end of the original alignment conveyor.

A crucial aspect necessary for the efficient operation of an article distribution center that receives articles in random clusters is that the alignment conveyor in each conveyor line adequately singulate the articles, and minimize the occurrence of "side-by-side" articles. "Side-by-side" articles, as they are referred to in the industry, are two or more articles positioned laterally adjacent along the alignment conveyor, and remain so when discharged from the alignment conveyor. The presence of "side-by-side" articles interferes with the proper scanning procedure of the sortation conveyor, due to the scanner's inability to scan more than one article simultaneously.

Given the importance of adequately singulating articles prior to introduction to the sortation conveyor, the industry has advanced several alignment conveyors designed to minimize the occurrence of "side-by-side" articles. One example of an effective alignment conveyor is disclosed in commonly assigned U.S. Pat. No. 5, 918,723, issued to Schuitema et al. This alignment conveyor addresses the problem of side by side articles by providing a recirculation assembly configured to recirculate unsingulated articles upstream to the input end of the alignment conveyor of the same conveyor line, thereby allowing clusters of articles to recirculate as individual articles are fed downstream.

One problem frequently encountered in article distribution centers occurs when a large number, or volume, of articles are being transported through the alignment conveyor of a particular conveyor line. If the alignment conveyor experiences a high volume of articles for a certain period of time, a bottleneck may form. This bottleneck may require the input conveyor of that conveyor line to be shut down until the bottleneck is cleared. Shutting down the input conveyor of a particular conveyor line reduces the throughput of the article distribution center.

An additional problem commonly encountered in article distribution centers occurs when a sortation conveyor is shut down for maintenance or due to a jam. As the article distribution center normally include a plurality of fixed docks or bays wherein the articles are unloaded onto one of the conveyor lines, in certain instances, articles already unloaded are being conveyed towards the alignment conveyor despite the sortation conveyor being offline. Also, articles may continue to be unloaded onto the conveyor line despite the temporary inoperability of the sortation conveyor, such as where the sortation conveyor is shut down due to a jam. Although an adjacent conveyor line may be experiencing low volume or no volume at all, the articles unloaded onto a particular conveyor line cannot be redistributed or diverted once placed upon the input conveyor. Consequently, these articles sit on the conveyor line until the sortation conveyor is brought online. As a result, a large volume of articles remain unprocessed until the maintenance is completed, or the problem with the sortation conveyor is remedied, thereby decreasing the efficiency of the article distribution center.

Consequently, there is a need for a conveyor system capable of effectively sharing the volume of articles between adjacent conveyor lines during peak volume periods or when the sortation conveyor is offline.

SUMMARY OF THE INVENTION

Accordingly, in one aspect, the present invention includes a conveyor system having at least one conveyor line equipped with an alignment conveyor. The alignment conveyor includes a first region configured to singulate articles and a second region configured to convey articles away from the first region. A first output conveyor extends from the first region, while a second output conveyor extends from the second region. Both the first and the second output conveyers convey articles downstream of the alignment conveyor. Providing a second output conveyor configured to accept overflow articles from the alignment conveyor during periods of high volume and transport those articles to a point downstream of the alignment conveyor results in a load sharing conveyor system capable of redirecting short term over capacity on the alignment conveyor. Reducing the over capacity experienced by a particular alignment conveyor increases the throughput of the conveyor system.

According to another aspect of the invention, a conveyor system includes a plurality of conveyor lines, at least one of which includes an alignment conveyor having a first region whereupon articles are singulated and a second region configured to convey articles away from the first region. An overflow handler is configured to receive articles from the second region of a conveyor line and transport the articles to an adjacent conveyor line. Conveying the overflow articles from one alignment conveyor to an adjacent conveyor line effectively shares the volume of articles among the conveyor lines. Sharing the volume of articles among a plurality of conveyor lines increases the throughput of the conveyor system by transferring unsingulated articles from a conveyor line experiencing peak volume flow to an adjacent conveyor line operating at less than capacity.

According to another aspect of the invention, a conveyor system includes a first and a second alignment conveyor, both of which include a first region in which articles are singulated and a second region configured to convey articles away from the first region. A sortation conveyor is positioned downstream of the second alignment conveyor. An overflow handler extends from the first alignment conveyor, and is configured to convey articles from the second region of the first alignment conveyor to the second alignment conveyor. Providing an overflow handler configured to convey overflow articles to an alignment conveyor of an adjacent conveyor line effectively shares the volume of articles between alignment conveyors.

According to still another aspect of the invention, a conveyor system includes at least one conveyor line with an alignment conveyor having a first region whereupon articles are singulated and a second region configured to convey articles away from the first region. A deflector assembly is provided which, when actuated, deflects articles away from the first region of the alignment conveyor. This deflector assembly permits articles to be deflected away from the first region when a downstream sortation conveyor is offline or jammed.

According to yet another aspect of the invention, a method for distributing a load of articles in a conveyor system includes singulating articles in a first region of an alignment conveyor, and conveying articles positioned in a second region of the alignment region downstream of the alignment conveyor. Conveying unsingulated articles downstream of the alignment conveyor enables the conveyor system to adequately process articles during periods of high volume by transporting the unsingulated articles to a region of the conveyor system where further processing may occur.

According to a further aspect of the invention, a method for redistributing articles in a conveyor system equipped with an alignment conveyor having a first region whereupon articles are singulated, and a second region configured to convey articles away from the first region includes deflecting articles away from the first region, and conveying articles from the second region of alignment conveyor downstream of the alignment region. Deflecting articles from the first region and conveying those articles downstream of the alignment conveyor permits articles to be efficiently processed in the event the sortation conveyor is offline or jammed.

The present invention facilitates high volume processing of articles by effectively conveying unsingulated articles from a conveyor line experiencing a high volume flow of articles to an adjacent conveyor line or other point downstream of the conveyor line, wherein the articles may be effectively and efficiently processed. This article volume sharing system distributes the articles within the conveyor system, and consequently, enhances the conveyor system's performance and efficiency.

These and other objects, advantages and features of the present invention will become apparent upon review of the following specification in conjunction with the drawings.

DESCRIPTION OF THE PREFERRED EMBODIMENTS

Figure 1:
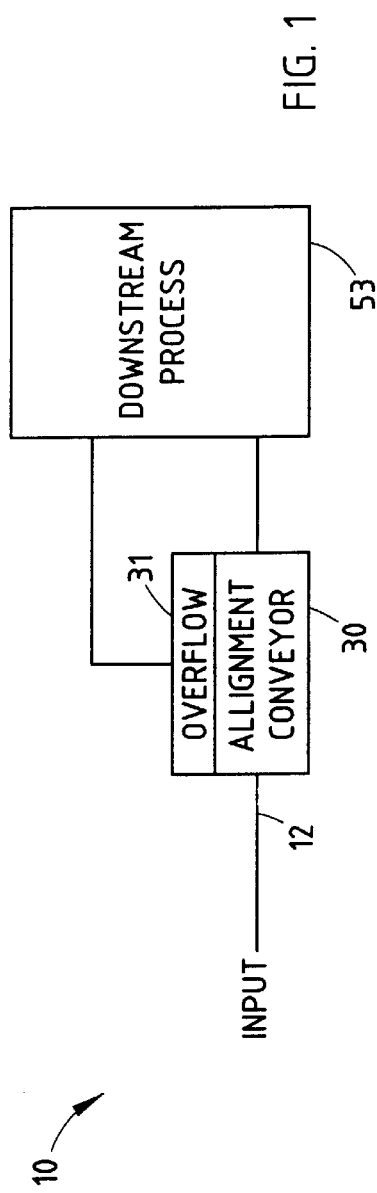
FIG. 1 is a diagrammatic representation of a conveyor system in block diagram form, according to a preferred embodiment of the present invention.

Referring now to the drawings and the illustrative embodiments depicted therein, a conveyor system 10 includes at least one conveyor line 12 having an alignment conveyor 30 configured to singulate articles and thereafter transport the singulated articles to a downstream process 53. Conveyor system 10 also includes an overflow handler 31 configured to convey unsingulated side-by-side, or overflow articles from alignment conveyor 30 to downstream process 53. Conveying overflow articles from alignment conveyor 30 to downstream process 53 defines a load sharing conveyor system which effectively distributes articles throughout conveyor system 10.

Referring now to FIGS. 2 through 8, conveyor system 10 includes a plurality of individual conveyor lines 12. As depicted in FIGS. 2, 3, 6 through 8, conveyor system 10 includes three separate conveyor lines 12. However, it will be recognized by those skilled in the art that conveyor system 10 may include any number of conveyor lines, as the number of conveyor lines within a conveyor system is dependent upon the particular application. Each conveyor line 12 includes an input conveyor 20, an alignment conveyor 30, and a volume sharer, or overflow handler 31. In the illustrated embodiment, overflow is defined as side-by-side articles, but may include excessive volume of articles, or other criteria. Input conveyor 20 may be one conveyor or a plurality of conveyors. Articles may be loaded onto input conveyor 20 by any means commonly utilized in the art, such as by an extendable conveyor of the type discussed in commonly assigned U.S. Pat. Nos. 5,423,413, 5,351,809, and 4,425,069, the disclosures of which are hereby incorporated herein by reference. Articles may be placed manually upon input conveyor 20, or may be mechanically loaded thereupon by any device commonly utilized in the art. Articles will typically be placed upon input conveyor 20 in a random orientation including clusters of articles, and are normally of varying length, weight, depth and height.

Articles move longitudinally along input conveyor 20 and are delivered to the input end 32 of an alignment conveyor 30. Alignment conveyor 30 is configured to align articles in a single file arrangement. As used herein, "singulation" means articles are arranged longitudinally in a single file and may, or may not, be separated by a gap, or distance, between the ends of adjacent articles. Once singulated, the articles are discharged from alignment conveyor 30 at output end 34. Once discharged from alignment conveyor 30, the articles may be transported by an output conveyor 42 to a takeaway conveyor 44, which may include an accumulation conveyor, the specifics of which are known to those with ordinary skill in the art. A suitable accumulation conveyor for use with the present invention is disclosed in commonly assigned U.S. patent application Ser. No. 09/258,380, filed Feb. 26, 1999, for an Unscrambling and Aligning Conveyor, the disclosure of which is hereby incorporated herein by reference. It will be recognized by artisans with ordinary skill that other accumulation conveyors may be utilized without departing from the spirit and scope of the invention.

Figure 6:
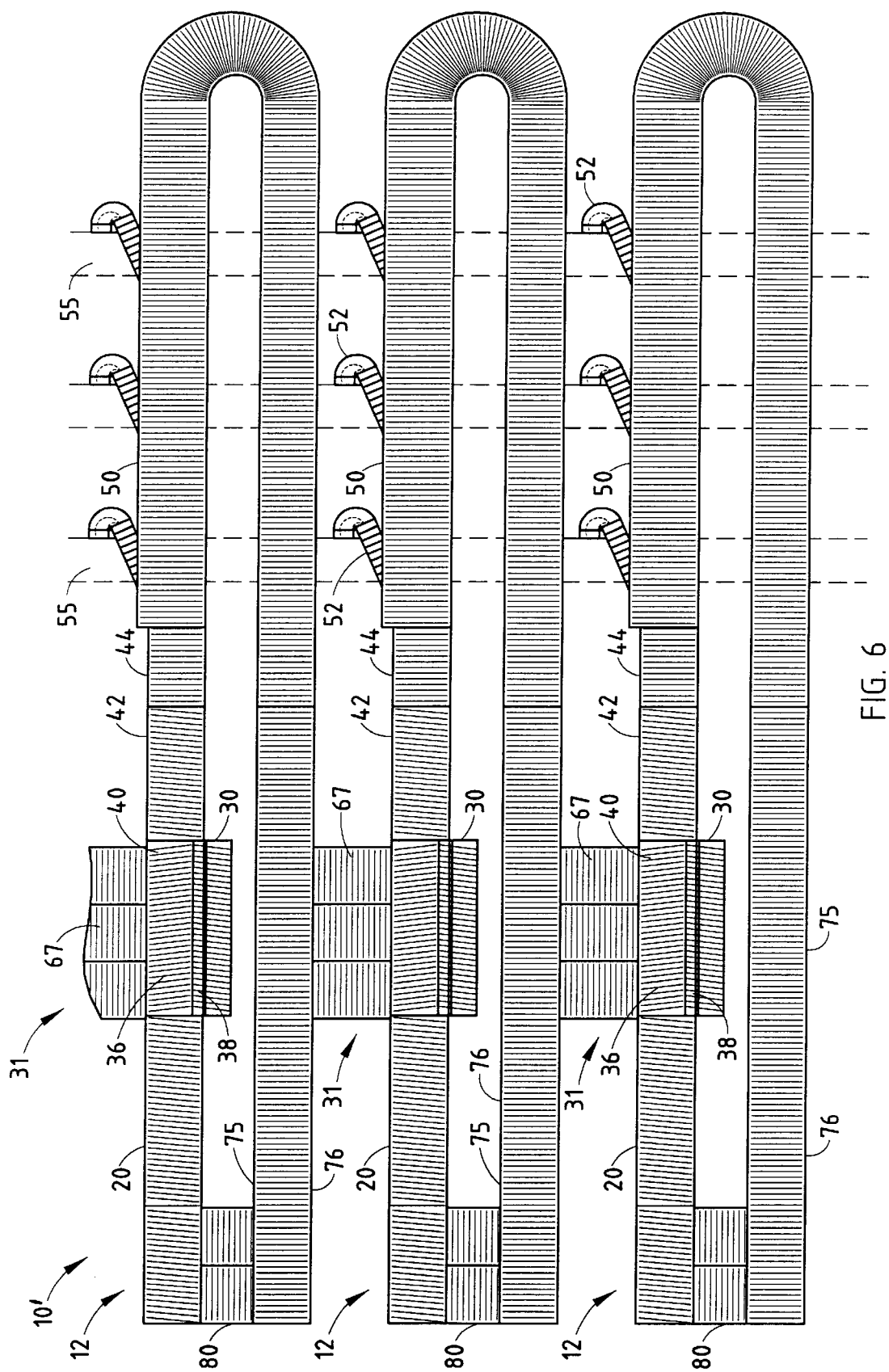
FIG. 6 is a plan view of a conveyor system according to the present invention, wherein each conveyor line includes a single alignment conveyor.
Figure 7:
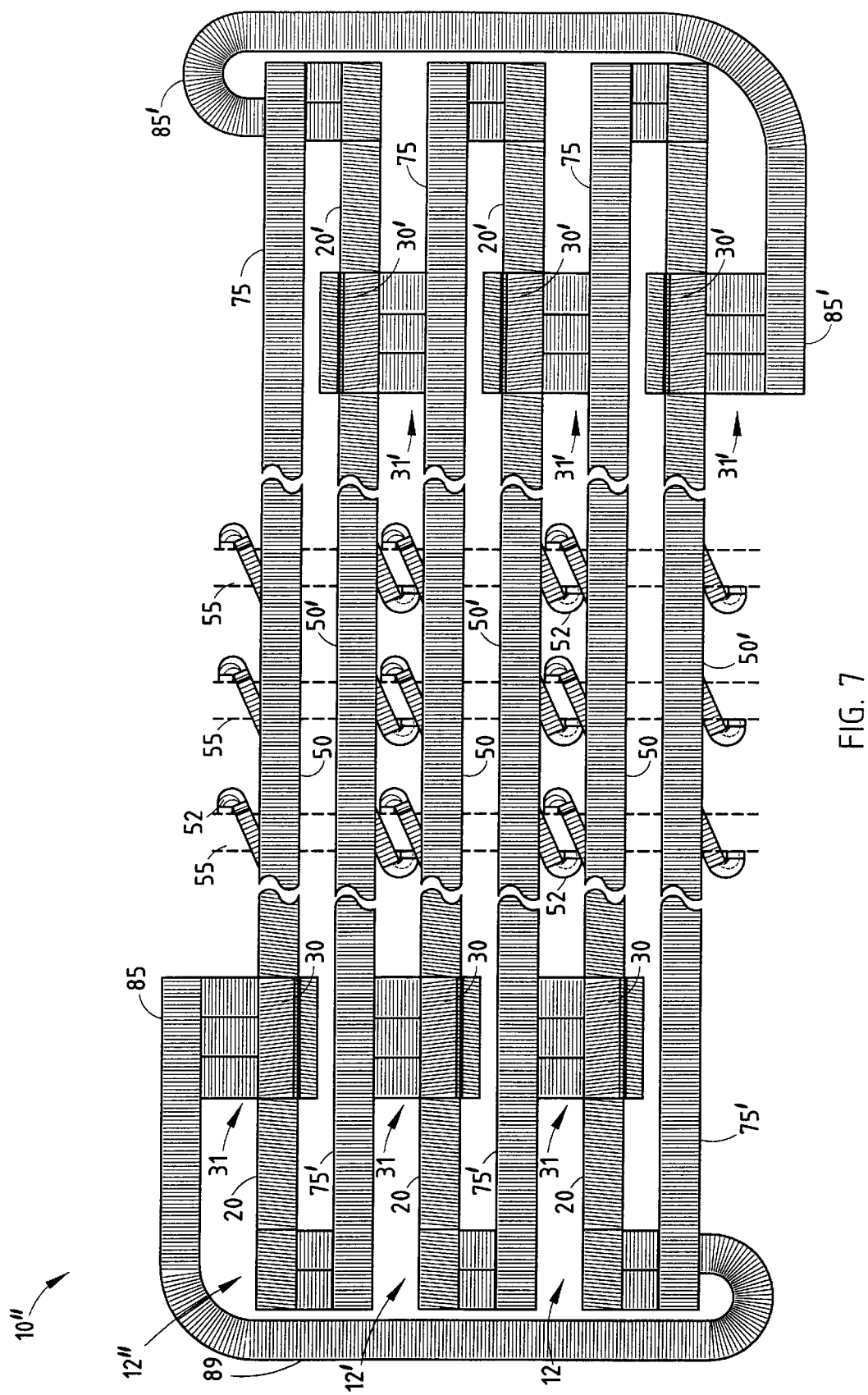
FIG. 7 is a plan view of a conveyor system according to the present invention, wherein each conveyor line includes a pair of remotely positioned alignment conveyors.

Takeaway conveyor 44 forwards the articles to a downstream process such as a sortation conveyor 50. Once delivered to sortation conveyor 50, the articles are scanned and sorted depending upon their departure destination. Articles diverted from sortation conveyor 50 are placed upon one of the plurality of departure conveyors 55. As can be seen in FIGS. 6 and 7, each sortation conveyor 50, in the illustrated embodiment, may contain a plurality of spurs such as spiral shaped chutes 52, enabling articles to be removed from sortation conveyor 50 and placed upon one of a plurality of departure conveyors 55. It will be recognized by those with ordinary skill in the art that an alternative configuration for sortation conveyor 50 may be utilized without departing from the spirit and scope of the present invention. Non-limiting examples of sortation conveyors which may be used with the present invention include a positive displacement sorter of the type disclosed in commonly assigned U.S. Pat. No. 5,127,510, a diverter sorter of the type disclosed in commonly assigned U.S. Pat. No. 5,452,786, the disclosures of which are hereby incorporated herein by reference, or other known sortation conveyors such as a cross belt sorter of the type disclosed in commonly assigned U.S. Pat. No. 5,588,520, or a tilt tray sorter of the type disclosed in commonly assigned U.S. Pat. 5,662,206, the disclosures of which are hereby incorporated herein by reference. Sortation conveyor 50 may be fed by a single line induct of the type disclosed in commonly assigned U.S. Pat. No. 5,341,916, or a multiple line induct of the type disclosed in commonly assigned U.S. Pat. No. 5,038,911, the disclosures of which are hereby incorporated herein by reference. Once deposited on a particular departure conveyor 55, the articles may be conveyed to a loading area where they are removed from departure conveyor 55 and shipped to their destination.

Each alignment conveyor 30 is formed having an article transport surface 36 positioned between input end 32 and output end 34. Article transport surface 36 is configured to singulate articles within an alignment, or first region 38. Article transport surface 36 further includes a second region 40. Second region 40 of article transport surface 36 is configured to move side-by-side articles away from first region 38 as the articles move longitudinally from input end 32 to output end 34. In this manner, when alignment conveyor 30 experiences the presence of side-by-side articles, second region 40 of article transport surface 36 transports one or more of the articles laterally remote from first region 38 in a direction away from first region 38.

Alignment conveyor 30 may be any alignment conveyor commonly utilized in the art having at least a first region wherein singulated articles are transported, and a second region configured to transport articles away from the first region. It will be understood by those with ordinary skill in the art that alignment conveyor 30 may have successive and separate regions configured to move articles away from the first region, without departing from the spirit and scope of the invention. Alignment conveyor 30 may be of the type disclosed in commonly assigned U.S. Pat. No. 5,918,723, issued Jul. 6, 1999 for a Compact Article Singulation Conveyor, the disclosure of which is hereby incorporated herein by reference. Other suitable alignment conveyors for use with the present invention include, but are not limited to, the alignment conveyors disclosed in U.S. Pat. No. 5,769,204, issued Jun. 23, 1998 to Okada et al. for a Singulator Conveyor System Having Package-Return Conveyors; U.S. Pat. No. 5,701,989, issued Dec. 30, 1997 to Boone et al. for a Conveyor For Removing An Article Conveyed Abreast Of Another Article; and U.S. Pat. No. 5,372,238, issued Dec. 13, 1994, to Bonnet for a Method and Apparatus for Singularizing Objects, the disclosures of which are hereby incorporated herein by reference. However, in each such patent, side-by-side articles are recirculated to the input of the same alignment conveyor; whereas alignment conveyor 30 passes side-by-side articles to an alternative input of the downstream process.

Each conveyor line 12 includes a volume sorter, or overflow handler 31 positioned adjacent alignment conveyor 30 which affects the removal of articles from second region 40 of an alignment conveyor 30 and transports such articles to an alignment conveyor 30 positioned in an adjacent conveyor line 12. That is, overflow handler 31 removes the overflow articles, i.e., those articles not singulated within first region 38, positioned in second region 40 of article transport surface 36. In a preferred embodiment, overflow handler 31 is located proximate to second region 40 of article transport surface 36, and receives articles therefrom and transports the articles to a recirculation conveyor 75 of an adjacent conveyor line 12. Recirculation conveyor 75 includes a main conveyor 76 and a coupling conveyor 80 positioned substantially at a right angle to main conveyor 76. Coupling conveyor 80 may include one or more guards (not shown) to prevent articles from being conveyed off coupling conveyor 80. Coupling conveyor 80 transports articles onto input conveyor 20 of an adjacent conveyor line 12. Main conveyor 76 and coupling conveyor 80 of recirculation conveyor 75 may be a belt or roller driven conveyor. Once conveyed to input conveyor 20, the articles are thereafter presented to the alignment conveyor 30 in the adjacent conveyor line 12. Thus, a particular conveyor line 12 experiencing a high volume of article flow will be able to divert articles from that conveyor line 12 to an adjacent conveyor line 12 so as to effect volume sharing of the article load. Volume sharing of the articles among adjacent conveyor lines 12 significantly increases the throughput of the conveyor system 10 by balancing the article load among the conveyor lines 12.

Each overflow handler 31 includes one or more peel-away conveyors 67. In the illustrated embodiment, each overflow handler 31 includes three peel-away conveyors 67, but fewer than three or more than three may be used. Each peel-away conveyor 67 includes a conveying surface 68, which may be formed of a plurality of generally parallel rollers 69 configured to transport articles in a direction substantially perpendicular to, and away from, the direction of articles being conveyed along first region 38 of article transport surface 36, although belt conveyors or chutes may be used. Rollers 69 are supported by supports 88. In the illustrated embodiment, rollers 69 of conveyors 67 rotate about axes which are generally perpendicular to supports 88.

Figure 3:
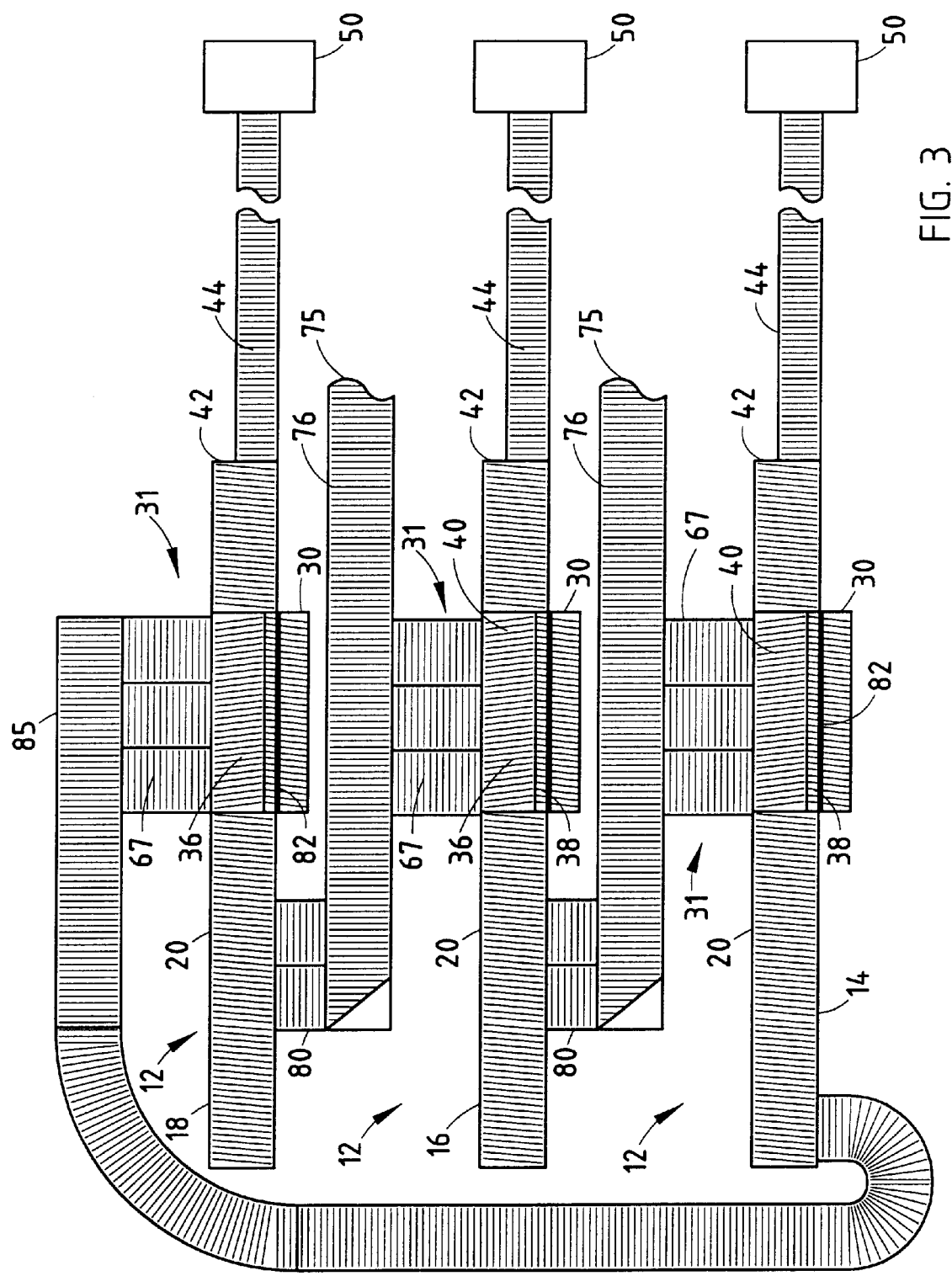
FIG. 3 is a plan view of a conveyor system according to the present invention.

As depicted in FIG. 3, conveyor lines 12 of conveyor system 10 include a first conveyor line 14, and a last conveyor line 18, which may be separated by one or more intermediate conveyor lines 16. The overflow handler 31 in operational connection with last conveyor line 18 transports articles to a return conveyor 85. Return conveyor 85 returns articles placed thereupon to input conveyor 20 of first conveyor line 14, and thus, overflow articles from last conveyor line 18 are conveyed to first conveyor line 14, and subsequently processed. Return conveyor 85 may be a belt or roller driven conveyor. Furthermore, it will be recognized by those with ordinary skill in the art that return conveyor 85 may include one or more right angle conveyors without departing from the spirit and scope of the invention.

Figure 4:
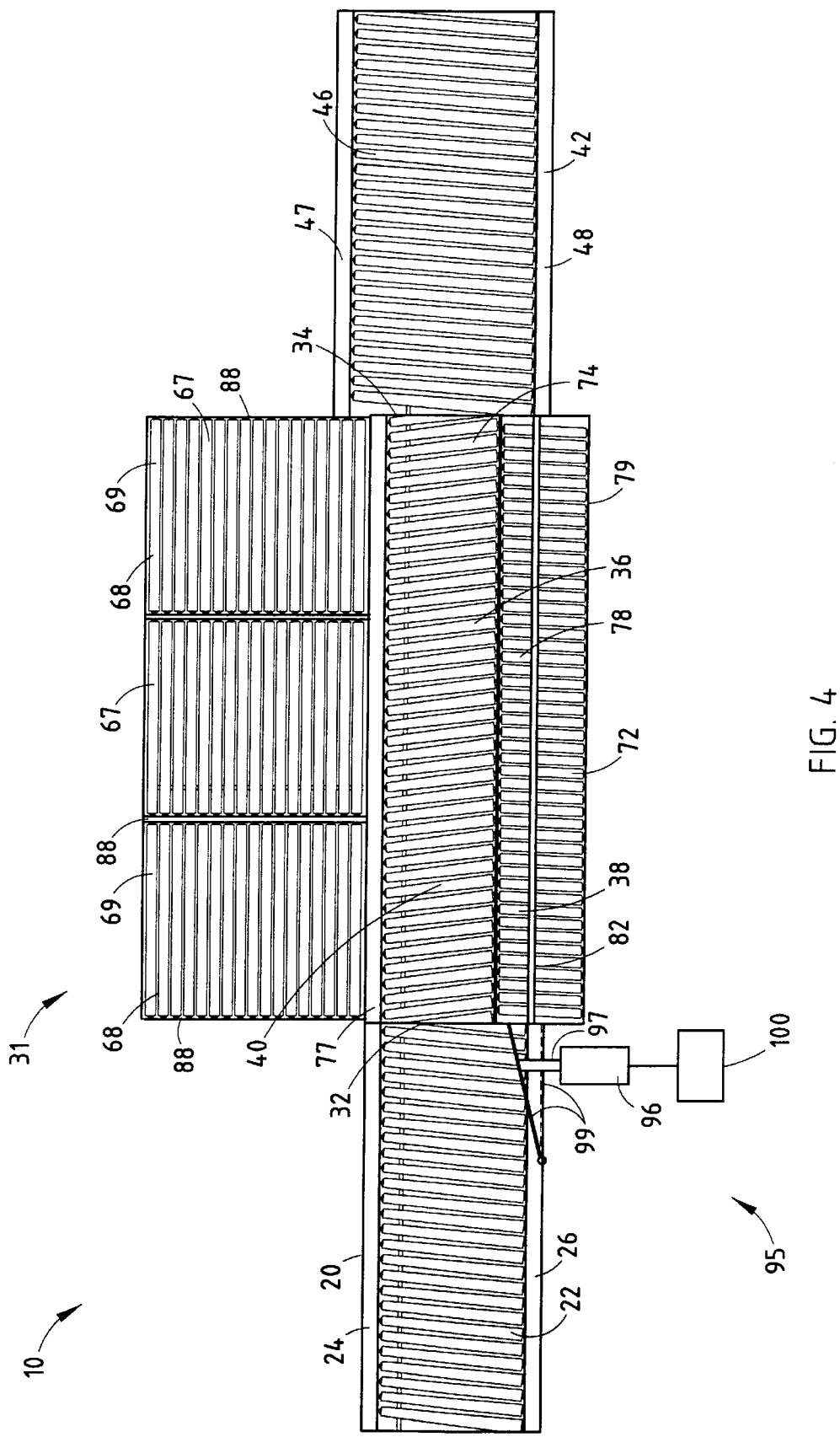
FIG. 4 is detailed plan view of the alignment conveyor, deflector assembly and overflow handler of the present invention.
Figure 5:
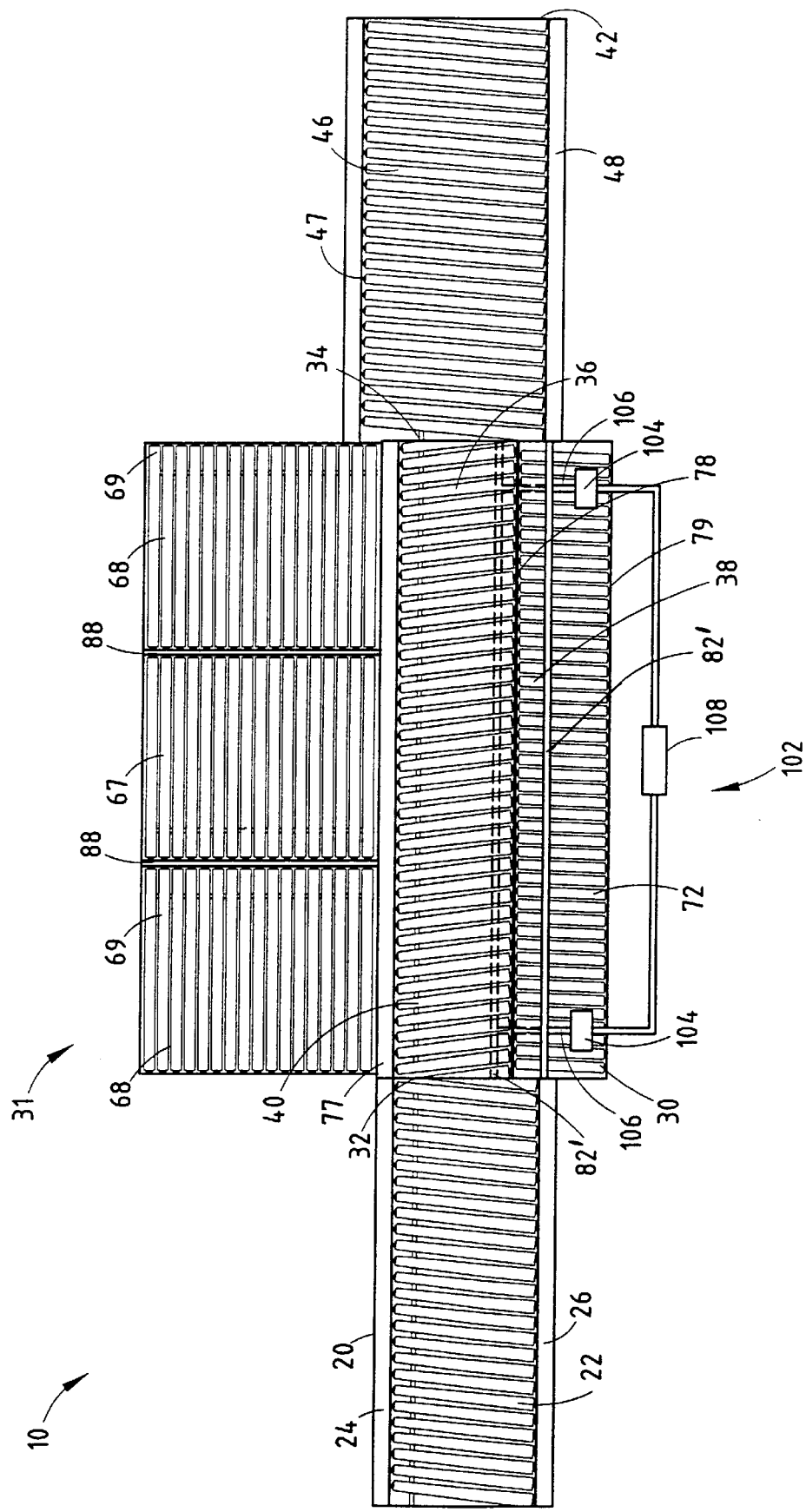
FIG. 5 is the same view as FIG. 4, illustrating a deflector assembly according to an alternative preferred embodiment of the present invention.

Turning now to FIGS. 4 and 5, in a preferred embodiment, article transport surface 36 of alignment conveyor 30 is defined by a first plurality of generally parallel rollers 72 positioned in first region 38, and a second plurality of generally parallel rollers 74 positioned in second region 40. Articles contacting rollers 72 tend to move in a forward direction whereas articles, such as side-by-side articles, contacting rollers 74 tend to be removed by overflow handler 31. Rollers 74 are configured to urge articles laterally towards overflow handler 31 as the articles are transported from input end 32 to output end 34 of alignment conveyor 30. This may be accomplished by various known techniques. Preferably, rollers 74 are attached to a pair of support members 77 and 78, such that rollers 74 rotate about axes which are skewed with respect to support members 77,78.

Rollers 72, positioned in first region 38, are attached to support members 78 and 79. Positioned above rollers 72, and within first region 38, is a longitudinally positioned guide member 82. Guide member 82 can be any guide member normally encountered in the art of conveyor systems which provides an alignment surface to align articles positioned within first region 38. Rollers 72 are configured to singulate articles within first region 38, and against guide member 82. This may be accomplished by various known techniques. Preferably, rollers 72 rotate about axes which are skewed with respect to support members 78 and 79 in order to urge articles toward first region 38 and against guide member 82. Also, rollers 72 may be formed of a material having a higher coefficient of friction than rollers 74, such as a powered roller having a friction enhancing surface of the type disclosed in commonly assigned U.S. Pat. No. 5,735,388, the disclosure of which is hereby incorporated herein by reference, although other high friction coated rollers or belts may be used, such as the high friction surface disclosed in U.S. Pat. No. 5,701,989. The high friction material of rollers 72 reduces the longitudinal progress of articles positioned within first region 38, and consequently promotes effective singulation.

Input conveyor 20 includes a plurality of rollers 22 supported by support members 24 and 26. Preferably, rollers 22 rotate about axes which are skewed with respect to support members 24 and 26. Rollers 22 are skewed such that the articles conveyed thereupon are urged toward support member 26. Movement of articles toward support member 26 of input conveyor 20 promotes effective singulation by introducing articles to input end 32 of alignment conveyor 30 in a position proximate to first region 38. Output conveyor 42 includes a plurality of rollers 46 supported by support members 47 and 48. Preferably, rollers 46 are skewed with respect to support members 47 and 48 such that articles discharged from output end 34 of alignment conveyor 30 are urged toward support member 48. Maintaining articles in singulation along support member 48 of output conveyor 42 enhances the ability of sortation conveyor 50 to properly scan and subsequently sort articles.

A deflector assembly 95 may be positioned in operational connection with input conveyor 20. Deflector assembly 95 includes an actuator 96 operably connected to a movable arm 97. Movable arm 97 is attached to a rotatable gate 99. Rotatable gate 99 is pivotably attached to support member 26 of input conveyor 20. When sortation conveyor 50 of a particular conveying line 12 becomes jammed or is offline due to maintenance, rotatable gate 99 of deflector assembly 95 deflects articles approaching input end 32 of alignment conveyor 30 towards second region 40, and discourages articles from entering first region 38. Consequently, articles loaded onto input conveyor 20 will contact rollers 74 and thereby travel towards overflow handler 31. Overflow handler 31 will subsequently affect the transportation of the articles to an adjacent conveyor line 12. When it is desired to enable articles positioned on input conveyor 20 to be singulated within first region 38 of alignment conveyor 30, a signal is sent to controller 100 to thereby move rotatable gate 99 to its deactuated position illustrated by the dotted line in FIG. 4.

With reference to FIG. 5, an alternative deflector assembly 102 is illustrated in conjunction with alignment conveyor 30. Deflector assembly 102 includes one or more actuators 104, each of which is equipped with a movable arm 106. Movable arms 106 are attached to a movable guide member 82'. When it is desired to prevent articles from being singulated within first region 38, guide member 82' is positioned in second region 40, whereby articles introduced to alignment conveyor 30 are discouraged from entering first region 38. In addition, any articles positioned in first region 38 are moved towards, and onto, rollers 74 of second region 40. When singulation within first region 38 is desired, a signal is sent to controller 108 to thereby retract guide member 82' to the position indicted by the solid line in FIG. 6. It will be understood by those with ordinary skill in the art that deflector assembly 95 and deflector assembly 102 may both be used simultaneously with an alignment conveyor 30 without departing from the spirit and scope of the invention. It should also be understood that the particular configuration of such deflector assembly is not critical and variations may suggest themselves to the skilled artisan.

Turning now to FIG. 6, there is shown a conveyor system 10', wherein each conveyor line 12 contains a recirculation conveyor 75'. Recirculation conveyor 75 receives the output, or articles which remain unsorted by sortation conveyor 50, and recirculates those articles to the input conveyor 20 of the same conveyor line 12. Thus, in this embodiment, each overflow handler 31 diverts articles from an alignment conveyor 30 of a conveying line 12 and forwards such articles to recirculation conveyor 75, whereon such articles are subsequently forwarded to the input conveyor 20, and thereafter to the alignment conveyor 30 of the adjacent conveyor line 12.

With respect to FIG. 7, there is shown a conveyor system 10'' equipped with conveyor lines 12, 12' and 12''. Each conveyor line 12 through 12'' is equipped with a pair of alignment conveyors 30 and 30'. This embodiment may be used in article distribution centers wherein opposing ends of the facility are equipped with unloading docks. Articles transported from alignment conveyor 30 are received by a sortation conveyor 50. Articles not sorted by sortation conveyor 50 are transported by recirculation conveyor 75 to input conveyor 20' and are combined with articles supplied to input conveyor 20', and subsequently singulated by alignment conveyor 30'. Thereafter, the articles are forwarded to sortation conveyor 50'. If unsorted upon leaving sortation conveyor 50', the articles are transported by recirculation conveyor 75' to input conveyor 20 and thereafter singulated, along with articles supplied to input conveyor 20, by alignment conveyor 30. Thus, it is apparent that each conveyor line 12 through 12'' forms a conveyor loop defined by alignment conveyors 30 and 30', sortation conveyors 50, 50' and recirculation conveyors 75, 75'.

In conveyor system 10'', each alignment conveyor 30 and 30' is equipped with an overflow handler 31, 31', respectively. Each overflow handler 31 is in operational connection with the alignment conveyor 30 of a conveyor line 12 through 12'' and transports articles to recirculation conveyor 75'. Recirculation conveyor 75' subsequently forwards articles to the alignment conveyor 30 present in the adjacent conveyor line 12' or 12''. Return conveyor 85 conveys articles from overflow handler 31 of conveyor line 12'' to recirculation conveyor 75' of conveyor line 12. Each overflow handler 31' transports articles from alignment conveyor 30' to recirculation conveyor 75. Thereafter, recirculation conveyor 75 conveys the articles to an alignment conveyor 30', positioned in an adjacent conveyor line 12 or 12'. Return conveyor 85' conveys articles from overflow handler 31' of conveyor line 12 to recirculation conveyor 75 of conveyor line 12''.

Figure 8:
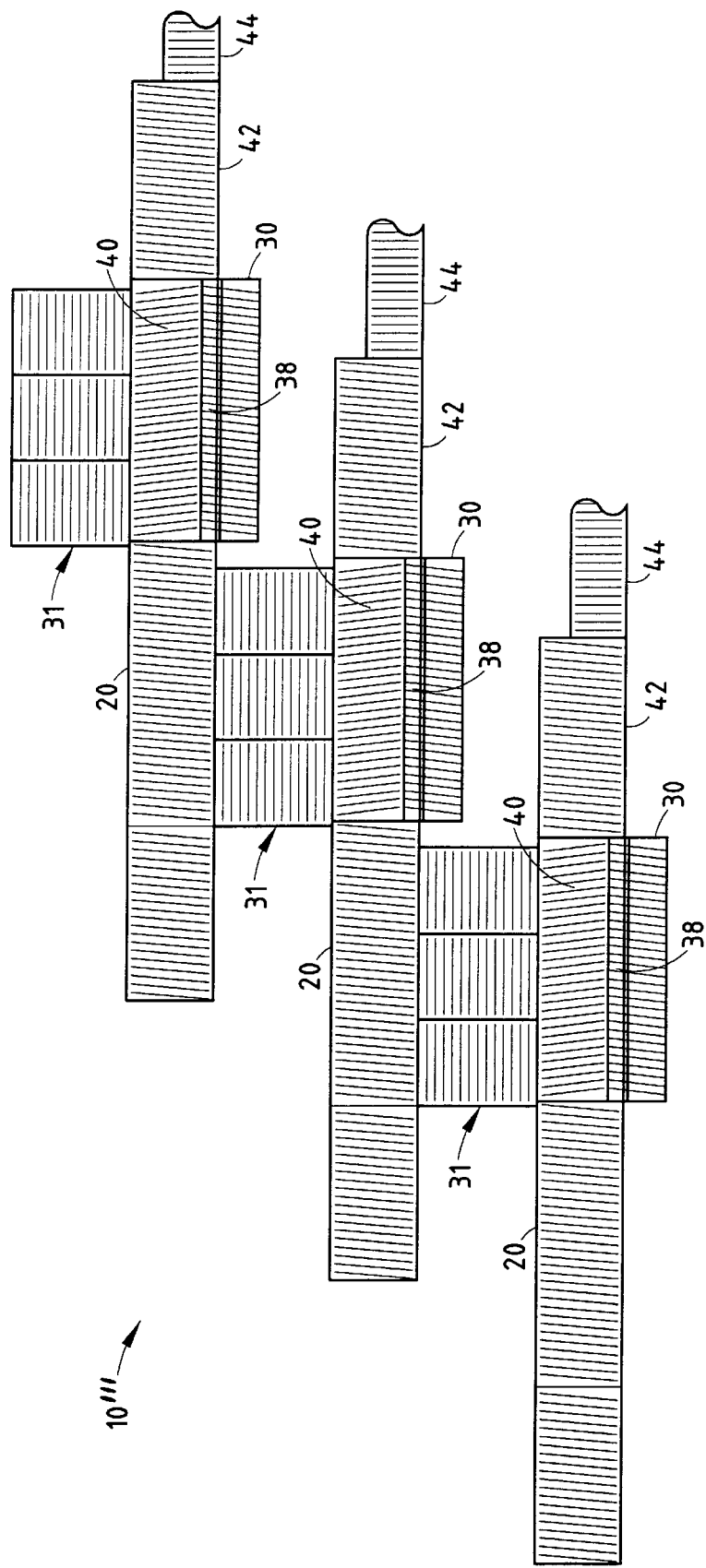
FIG. 8 is a plan view of a conveyor system according to an alternative preferred embodiment of the present invention.

Turning now to FIG. 8, there is shown an alternative preferred embodiment of a conveyor system 10'' having a plurality of conveyor lines 12. In this embodiment, overflow handler 31 transports articles from second region 40 of alignment conveyor 30 and forwards the same to the input conveyor 20 of an adjacent conveyor line 12. This embodiment may be used in conveyor systems where the output of the downstream process is not recirculated to the input conveyor located upstream of the alignment conveyor.

Figure 9:
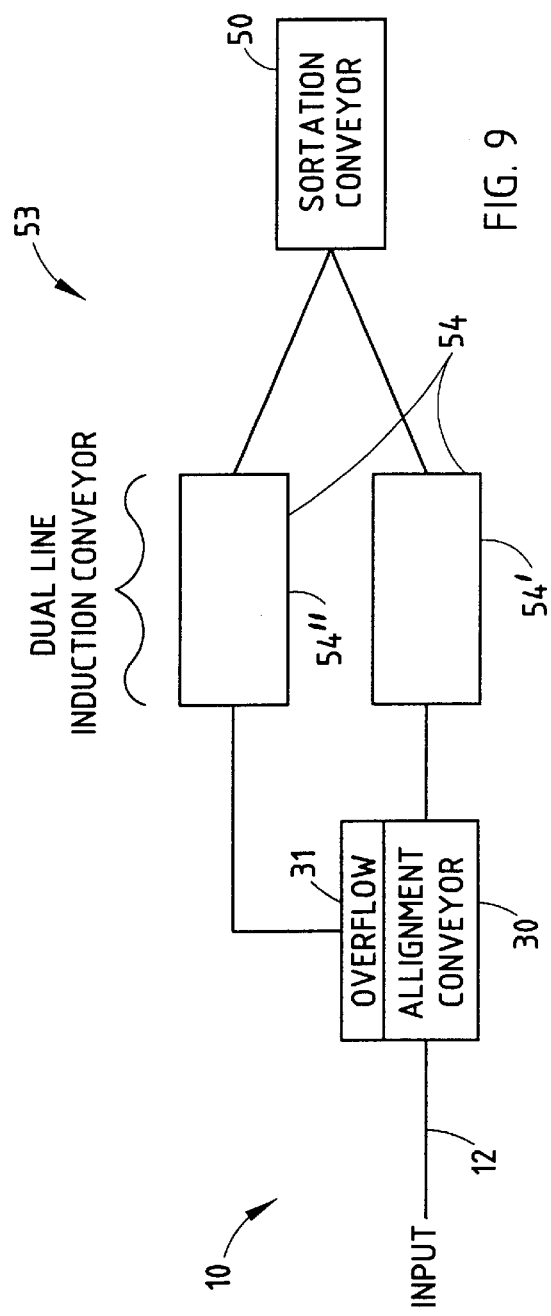
FIG. 9 is the same view as FIG. 1, according to another alternative preferred embodiment of the present invention.
Figure 2:
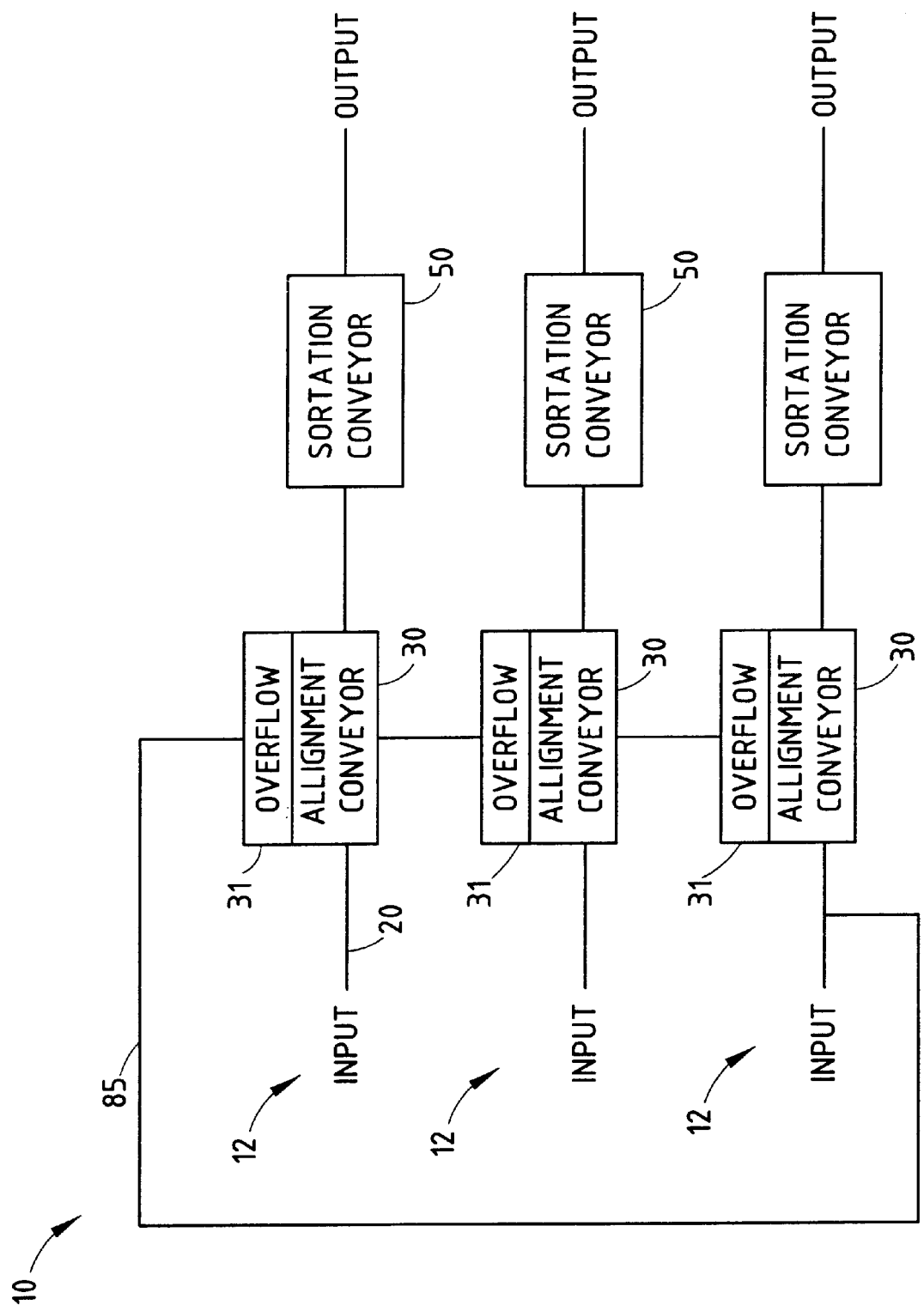
FIG. 2. is the same view as FIG. 1, according to an alternative preferred embodiment of the present invention.

In another alternative, as depicted in FIG. 9, a downstream process 53 includes a dual line induction conveyor 54, the specifics of which are known to those with ordinary skill in the art, feeding a sortation conveyor 50. One line 54' of dual line induction conveyor 54 is supplied by alignment conveyor 30 and the other line 54'' of dual line induction conveyor 54 is supplied by overflow handler 31. A suitable dual line induction conveyor for use with the present invention is disclosed in commonly assigned U.S. Pat. No. 5,038,911, the disclosure of which is hereby incorporated herein by reference. It will be recognized by artisans with ordinary skill that other induction conveyors may be utilized without departing from the spirit and scope of the invention.

The above description is considered that of the preferred embodiments only. Modifications of the invention will occur to those skilled in the art and to those who make or use the invention. Therefore, it is understood that the embodiments as shown in the drawings and described above are merely for illustrative purposes and are not intended to limit the scope of the invention, which is defined by the following claims as interpreted according to the principles of patent law, including the doctrine of equivalents.

The embodiments of the invention in which an exclusive property or privilege is claimed are defined as follows:

1. A conveyor system comprising:
   least first and second conveyor lines, each conveyor line having an alignment conveyor including a first region whereupon articles are singulated, and a second region configured to convey articles away from said first region;
   each conveyor line further having a first output conveyor extending from the first region of said alignment conveyor; and
   said first conveyor line having an overflow handler configured to convey articles from the second region of said alignment conveyor of said first conveyor to said second conveyor line, said first output conveyor of each said first and second conveyor lines conveying articles downstream of said alignment conveyor of said first and second conveyor lines to a downstream process, thereby defining a load sharing system.

2. The conveyor system as recited in claim 1, wherein said second overflow handler has a conveying surface, said conveying surface configured to convey articles in a direction away from, and generally perpendicular to the direction of said first region of said alignment conveyor.

3. The conveyor system as recited in claim 1, further comprising a dual line induction conveyor positioned downstream of said alignment conveyor, said second output conveyor conveying articles to said dual line induction conveyor.

4. The conveyor system as recited in claim 1, wherein said at least one conveyor line is a first conveyor line and a second conveyor line, said second output conveyor of said first conveyor line conveying articles to said alignment conveyor of said second conveyor line.

5. The conveyor system as recited in claim 1, wherein said second conveyor line has an input conveyor positioned upstream of said alignment conveyor, said second output conveyor of said first conveyor line conveying articles to said input conveyor of said second conveyor line.

6. The conveyor system as recited in claim 1, wherein said second conveyor line includes a recirculation conveyor, said recirculation conveyor conveying articles to said alignment conveyor of said second conveyor line, and wherein said second output conveyor conveys articles to said recirculation conveyor of said second conveyor line.

7. The conveyor system as recited in claim 1, wherein said alignment conveyor further comprises a first conveying surface positioned in said first region, said first conveying surface configured to singulate articles in said first region; and
   a second conveying surface positioned in said second region, said second conveying surface configured to convey articles longitudinally from said first conveying surface and towards said second output conveyor.

8. The conveyor system as recited in claim 7, wherein said first conveying surface further comprises a first plurality of rollers, said first plurality of rollers skewed towards said first region.

9. The conveyor system as recited in claim 8, wherein said second conveying surface further comprises a second plurality of rollers, said second plurality of rollers skewed towards said second output conveyor.

10. The conveyor system as recited in claim 1, wherein said first output conveyor includes a plurality of rollers skewed in a direction away from said second output conveyor.

11. The conveyor system as recited in claim 1, wherein said at least one of said first a second conveyor lines further comprises a deflector assembly positioned upstream of said alignment conveyor, said deflector assembly configured to selectively deflect articles away from said first region of said alignment conveyor.

12. The conveyor system as recited in claim 11, wherein said at least one of said first and second conveyor lines includes an input conveyor positioned upstream of said alignment conveyor, and wherein said deflector assembly is at said input conveyor.

13. The conveyor system as recited in claim 12, wherein said deflector assembly further comprises an actuator and a rotatable gate in operational connection with said actuator, wherein said rotatable gate is attached to said input conveyor.

14. The conveyor system as recited in claim 11, wherein said alignment conveyor further comprises a movable guide member positioned in said first region, said deflector assembly operably connected to said movable guide member, said deflector assembly retractably positioning said movable guide member in said second region when in said second position.

15. The conveyor system as recited in claim 1, wherein at least one of said first and second conveyor lines includes an input conveyor positioned upstream of said alignment conveyor, said input conveyor having a plurality of rollers configured to urge articles toward said first region of said alignment conveyor.

16. The conveyor system as recited in claim 1, wherein said second output conveyor is at least one peel-away conveyor.

17. A conveyor system comprising:
at least one conveyor line having an alignment conveyor including a first region whereupon articles are singulated, and a second region configured to convey articles away from said first region;
a first output conveyor extending from the first region of said alignment conveyor, wherein said alignment conveyor further comprises an input end, an output end and an article transport surface positioned between said input end and said output end, wherein said article transport surface includes a first conveying surface and a second conveying surface, said first conveying surface positioned in said first region, said first conveying surface configured to singulate articles in said first region longitudinally from said input end to said output end, said second conveying surface positioned in said second region, said second conveying surface configured to convey articles longitudinally from said input end to said output end and towards said second output conveyor, wherein said first conveying surface further comprises a first plurality of rollers, said first plurality of rollers skewed towards said first region, wherein said second conveying surface further comprises a second plurality of rollers, said second plurality of rollers skewed towards said second output conveyor, wherein each roller of said first plurality of rollers has a first coefficient of friction, wherein each roller of said second plurality of rollers has a second coefficient of friction, and wherein said first coefficient of friction is greater than said second coefficient of friction;
a second output conveyor extending from the second region of said alignment conveyor, said first output conveyor and said second output conveyor conveying articles downstream of said alignment conveyor to define a load sharing system.

18. A conveyor system comprising:
a first alignment conveyor and a second alignment conveyor, said first alignment conveyor and said second alignment conveyor each having a first region whereupon articles are singulated, and a second region configured to convey articles away from said first region;
a sortation conveyor positioned downstream of said second alignment conveyor; and
a first overflow handler configured to convey articles from said second region of said first alignment conveyor to said second alignment conveyor, wherein said first alignment conveyor and said second alignment conveyor further comprises an input end, an output end, and an article transport surface positioned between said input end and said output end, wherein said article transport surface includes a first conveying surface and a second conveying surface, said first conveying surface positioned in said first region, said first conveying surface configured to singulate articles in said first region longitudinally from said input end to said output end, said second conveying surface positioned in said second region, said second conveying surface configured to convey articles longitudinally from said input end to said output end, and away from said first region, wherein said first conveying surface further comprises a first plurality of rollers, said first plurality of rollers skewed towards said first region, wherein said second conveying surface further comprises a second plurality of rollers, said second plurality of rollers skewed away from said first region, wherein each roller of said first plurality of rollers has a first coefficient of friction, wherein each roller of said second plurality of rollers has a second coefficient of friction, and wherein said first coefficient of friction is greater than said second coefficient of friction.

19. A conveyor system comprising:
a plurality of conveyor lines, each of said plurality of conveyor lines including an alignment conveyor having a first region whereupon articles are singulated, a second region configured to convey articles away from said first region, and an output conveyor extending from said first region; and
at least one of said plurality of conveyor lines including an overflow handler, said overflow handler configured to convey articles from said second region of said alignment conveyor of said at least one of said conveyor lines to an adjacment conveyor line of said plurality of conveyor lines for load sharing between said conveyor lines, said output conveyors of said plurality of conveyor lines conveying articles to a downstream process.

20. The conveyor system as recited in claim 19, wherein said overflow handler includes at least one peel-away conveyor.

21. The conveyor system as recited in claim 20, wherein said at least one peel-away conveyor has a conveying surface configured to convey articles in a direction away from, and generally perpendicular to the direction of said first region of said alignment conveyor.

22. The conveyor system as recited in claim 19, wherein said alignment conveyor further comprises an input end, an output end and an article transport surface positioned between said input end and said output end, wherein said article transport surface includes:
a first conveying surface positioned in said first region, said first conveying surface configured to singulate articles in said first region longitudinally from said input end to said output end; and a second conveying surface positioned in said second region, said second conveying surface configured to convey articles longitudinally from said input end to said output end, and towards said overflow handler.

23. The conveyor system as recited in claim 22, wherein said first conveying surface further comprises a first plurality of rollers, said first plurality of rollers skewed towards said first region.

24. The conveyor system as recited in claim 23, wherein said second conveying surface further comprises a second plurality of rollers, said second plurality of rollers skewed towards said overflow handler.

25. The conveyor system as recited in claim 19, wherein said at least one conveyor line of said plurality of conveyor lines further comprises at least a first conveyor line, and a last conveyor line, wherein said last conveyor line has a return conveyor operably connected to said overflow handler, said return conveyor conveying articles from said overflow handler of said last conveyor line to said alignment conveyor of said first conveyor line.

26. The conveyor system as recited in claim 19, wherein said at least one conveyor line of said plurality of conveyor lines further comprises a deflector assembly positioned upstream of said alignment conveyor, said deflector assembly configured to move between a first position and a second position, said deflector assembly deflecting articles away from said first region of said alignment conveyor when in said second position.

27. A conveyor system comprising:
plurality of conveyor lines, at least one conveyor line of said plurality of conveyor lines including an alignment conveyor and an overflow handler,
said alignment conveyor having a first region whereupon articles are singulated, and a second region configured to convey articles away from said first region; and
said overflow handler configured to convey articles from said second region of said alignment conveyor of one conveyor line of said plurality of conveyor lines to an adjacent conveyor line of said plurality of conveyor lines, wherein said overflow handler comprises at least on peel-away conveyor, wherein said at least one peel-away conveyor has a conveying surface configured to convey articles in a direction away from and generally perpendicular to the direction of said first region of said alignment conveyor, wherein said alignment conveyor further comprises an input end, an output end and an article transport surface positioned between said input end and said output end, wherein said article transport surface includes a first conveying surface and a second conveying surface, said first conveying surface positioned in said first region, said first conveying surface configured to singulate articles in said first region longitudinally from said input end to said output end, said second conveying surface positioned in said second region, said second conveying surface configured to convey articles longitudinally from said input end to said output end, and towards said overflow handler, wherein said first conveying surface further comprises a first plurality of rollers, said first plurality of rollers skewed towards said first region, wherein said second conveying surface further comprises a second plurality of rollers, said second plurality of rollers skewed towards said overflow handler, wherein each roller of said first plurality of rollers has a first coefficient of friction, wherein each roller of said second plurality of rollers has a second coefficient of friction, and wherein said first coefficient of friction is greater than said second coefficient of friction.

28. A conveyor system comprising:
a plurality of conveyor lines, wherein each conveyor line of said plurality of conveyor lines further comprises an alignment conveyor and at least one conveyor line of said plurality of conveyor lines includes an overflow handler,
each said alignment conveyor having a first region whereupon articles are singulated, and a second region configured to convey articles away from said first region; and
said overflow handler configured to convey articles from said second region of said alignment conveyor of said at least one conveyor line to an adjacent one of said conveyor lines, a sortation conveyor positioned downstream of said conveyor lines and a recirculation conveyor positioned downstream of said sortation conveyor, said recirculation conveyor conveying articles to one said alignment conveyor, and wherein said overflow handler conveys articles to said recirculation conveyor for load sharing between said conveyor lines.

29. A conveyor system comprising;
a first alignment conveyor and a second alignment conveyor, said first alignment conveyor and said second alignment conveyor each having a first region whereupon articles are singulated, and a second region configured to convey articles away from said first region;
sortation conveyor positioned downstream of said second alignment conveyor;
a first overflow handler configured to convey articles from said second region of said first alignment conveyor to said second alignment conveyor for load sharing between said alignment conveyors; and
output conveyors supplying said sortation conveyor with articles from said first regions of said first and second alignment conveyors.

30. The conveyor system as recited in claim 29, further comprising a recirculation conveyor positioned downstream of said sortation conveyor, said recirculation conveyor conveying articles to said second alignment conveyor.

31. The conveyor system as recited in claim 30, wherein said first overflow handler is configured to convey articles to said recirculation conveyor.

32. The conveyor system as recited in claim 29, further comprising a second overflow handler configured to convey articles from said second alignment conveyor downstream of said second alignment conveyor.

33. The conveyor system as recited in claim 32, further comprising a return conveyor operably connected to said second overflow handler, said return conveyor configured to convey articles from said second overflow handler to said first alignment conveyor.

34. The conveyor system as recited in claim 32, wherein said first overflow handler and said second overflow handler is at least one peel-away conveyor.

35. The conveyor system as recited in claim 34, wherein said at least one peel-away conveyor has a conveying surface configured to convey articles in a direction away from, and generally perpendicular to the direction of said first region.

36. The conveyor system as recited in claim 29, wherein said first alignment conveyor and said second alignment conveyor further comprises an input end, an output end, and an article transport surface positioned between said input end and said output end, wherein said article transport surface includes:

a first conveying surface positioned in said first region, said first conveying surface configured to singulate articles in said first region longitudinally from said input end to said output end; and a second conveying surface positioned in said second region, said second conveying surface configured to convey articles longitudinally from said input end to said output end, and away from said first region.

37. The conveyor system as recited in claim 36, wherein said first conveying surface further comprises a first plurality of rollers, said first plurality of rollers skewed towards said first region.

38. The conveyor system as recited in claim 37, wherein said second conveying surface further comprises a second plurality of rollers, said second plurality of rollers skewed away from said first region.

39. The conveyor system as recited in claim 29, wherein at least one alignment conveyor of said first and said second alignment conveyors further comprises a deflector assembly configured to selectively deflect articles away from said first region of said alignment conveyor.

40. A method for distributing a load of articles in a conveyor system, wherein the conveyor system includes at least first and second conveyor lines, each conveyor line having an alignment conveyor, wherein the alignment conveyor has a first region and a second region said method comprising the steps of:

singulating articles positioned within the first region of the alignment conveyor and conveying articles from the first region of the alignment conveyor of the first and second conveyor lines to a downstream process; and conveying articles positioned in the second region of the alignment conveyor of the first conveyor line to the second conveyor line for load sharing between the first and second conveyor lines.

41. The method as recited in claim 40, wherein said conveying step further comprises providing an overflow handler, said overflow handler conveying articles from the second region of the alignment conveyor of the first conveyor line to the second conveyor line.

42. The method as recited in claim 41, wherein said overflow handler further comprises at least one peel-away conveyor.

43. The method as recited in claim 41, wherein said overflow handler conveys articles from the second region of the alignment conveyor of the first conveyor line to the alignment conveyor of the second conveyor line.

* * * * *

UNITED STATES PATENT AND TRADEMARK OFFICE
CERTIFICATE OF CORRECTION

PATENT NO.      : 6,412,621 B1
DATED           : July 2, 2002
INVENTOR(S)     : Ronald J. De Vree and Harry T. Edwards It is certified that error appears in the above-identified patent and that said Letters Patent is hereby corrected as shown below:

<u>Title page,</u>
Item [54], Title, "CONVEYORS" should be -- CONVEYOR --

<u>Column 4,</u>
Line 13, delete "." after "2"

<u>Column 10,</u>
Line 4, insert -- at -- before "least"
Line 68, "a" should be -- and --

<u>Column 12,</u>
Line 45, "adjacment" should be -- adjacent --

<u>Column 13,</u>
Line 31, insert -- a -- before "plurality"
Line 41, "on" should be -- one --

<u>Column 14,</u>
Line 29, insert -- a -- before "sortation"

Signed and Sealed this

Fifteenth Day of April, 2003

JAMES E. ROGAN
*Director of the United States Patent and Trademark Office*